United States Patent

Furuya et al.

Patent Number: 5,852,471
Date of Patent: Dec. 22, 1998

[54] TELEVISION MULTIPLEX DATA EXTRACTING APPARATUS

[75] Inventors: Miki Furuya, Saitama; Tadashi Ezaki, Tokyo; Teruhiko Kori; Satoshi Tsuchiya, both of Kanagawa, all of Japan

[73] Assignee: Sony Corporation, Tokyo, Japan

[21] Appl. No.: 665,882

[22] Filed: Jun. 19, 1996

[30] Foreign Application Priority Data

Jun. 20, 1995 [JP] Japan ................................ 7-176684

[51] Int. Cl.⁶ .............................. H04N 7/00; H04N 11/00
[52] U.S. Cl. ........................ 348/465; 348/468; 348/461
[58] Field of Search ................................ 348/465, 468, 348/461, 467, 460, 478, 563; H04N 7/00, 11/00

[56] References Cited

U.S. PATENT DOCUMENTS

| | | | |
|---|---|---|---|
| 4,908,707 | 3/1990 | Kinghorn | 348/460 |
| 5,432,558 | 7/1995 | Kim | 348/460 |
| 5,453,794 | 9/1995 | Ezaki | 348/465 |
| 5,463,423 | 10/1995 | Tults | 348/465 |
| 5,483,289 | 1/1996 | Urade et al. | 348/465 |
| 5,552,833 | 9/1996 | Henmi et al. | 348/460 |
| 5,559,554 | 9/1996 | Uekane et al. | 348/589 |
| 5,561,461 | 10/1996 | Landis et al. | 348/460 |
| 5,629,738 | 5/1997 | Kim | 348/465 |

*Primary Examiner*—Nathan Flynn
*Attorney, Agent, or Firm*—Frommer Lawrence & Haug, LLP; William S. Frommer; Dennis M. Smid

[57] ABSTRACT

There is provided a highly flexible television multiplex data extracting apparatus which can fetch the multiplex data of the television broadcast services where the horizontal section for multiplexing data is not fixed, wherein a register receives an information from a controller to generate information for designating the horizontal section for fetching multiplex data, sampling frequency information of the data to be multiplexed and information for designating fetch of data, a sampling apparatus has the first and second fetch modes and detects any one mode of the first and second modes depending on the information from the register, the first mode is the extracting mode corresponding to the case where the horizontal section for multiplexing data is fixed and the second mode is designated to discriminate existence of the multiplex data in the designated horizontal section and fetch the data depending on the discrimination result.

11 Claims, 10 Drawing Sheets

| HAMMING CODE | | | | | | | | DATA MSB ← LSB | | | |
|---|---|---|---|---|---|---|---|---|---|---|---|
| D3 | P3 | D2 | P2 | D1 | P1 | D0 | P0 | D3 | D2 | D1 | D0 |
| 0 | 0 | 0 | 1 | 0 | 1 | 0 | 1 | 0 | 0 | 0 | 0 |
| 0 | 0 | 0 | 0 | 0 | 0 | 1 | 0 | 0 | 0 | 0 | 1 |
| 0 | 1 | 0 | 0 | 1 | 0 | 0 | 1 | 0 | 0 | 1 | 0 |
| 0 | 1 | 0 | 1 | 1 | 1 | 1 | 0 | 0 | 0 | 1 | 1 |
| 0 | 1 | 1 | 0 | 0 | 1 | 0 | 0 | 0 | 1 | 0 | 0 |
| 0 | 1 | 1 | 1 | 0 | 0 | 1 | 1 | 0 | 1 | 0 | 1 |
| 0 | 0 | 1 | 1 | 1 | 0 | 0 | 0 | 0 | 1 | 1 | 0 |
| 0 | 0 | 1 | 0 | 1 | 1 | 1 | 1 | 0 | 1 | 1 | 1 |
| 1 | 1 | 0 | 1 | 0 | 0 | 0 | 0 | 1 | 0 | 0 | 0 |
| 1 | 1 | 0 | 0 | 0 | 1 | 1 | 1 | 1 | 0 | 0 | 1 |
| 1 | 0 | 0 | 0 | 1 | 1 | 0 | 0 | 1 | 0 | 1 | 0 |
| 1 | 0 | 0 | 1 | 1 | 0 | 1 | 1 | 1 | 0 | 1 | 1 |
| 1 | 0 | 1 | 0 | 0 | 0 | 0 | 1 | 1 | 1 | 0 | 0 |
| 1 | 0 | 1 | 1 | 0 | 1 | 1 | 0 | 1 | 1 | 0 | 1 |
| 1 | 1 | 1 | 1 | 1 | 1 | 0 | 1 | 1 | 1 | 1 | 0 |
| 1 | 1 | 1 | 0 | 1 | 0 | 1 | 0 | 1 | 1 | 1 | 1 |

| | | LINE NUMBER | SAMPLE CLOCK OF DATA | CONTENTS |
|---|---|---|---|---|
| JAPAN | CHARACTER MUTIPLEX SIGNAL | 14-16, 21 277-279, 284 | 5.7272MHz (364fH =8/5fsc) | CHARACTER BROADCAST |
| | Video ID 525/60 | 20, 283 | Fsc/4 | VIDEO ADDITIONAL INFORMATION SUCH AS ASPECT PATIO ETC. |
| US | Closed Caption | 21 | 503kHz (32fH) | SUBTITLE BROADCAST FOR PERSON HAVING FUNCTIONAL DISORDER FOR SPEAKING AND HEARING. |
| | EDS Line 21 Field 2 | 284 | 503kHz (32fH) | Extended Data Service |
| EUROPE | Tele Text VPT, PDC | 7-22 320-335 | 6.9375MHz (444fH) | CHARACTER BROADCAST PROGRAM RESERVING INFORMATION |
| | VPS | 16 | 5.0MHz (320fH) | RESERVED VIDEO RECORDING INFORMATION FOR VTR |
| | PAL plus | FORMER HALF OF 23RD LINE | 5.0MHz (320fH) | GENERAL ADDITIONAL INFORMATION PAL plus ID |

TELEVISION MULTIPLEX DATA EXTRACTING APPARATUS

BACKGROUND OF THE INVENTION

1. Field of the Invention

The present invention relates to a television multiplex data extracting apparatus for extracting data multiplexed within the vertical blanking period of a television signal.

2. Description of Related Art

It is well known that various pieces of television broadcast services such as teletext can be realized by multiplexing data in the horizontal section within the vertical blanking period of a television signal.

Figure 11:
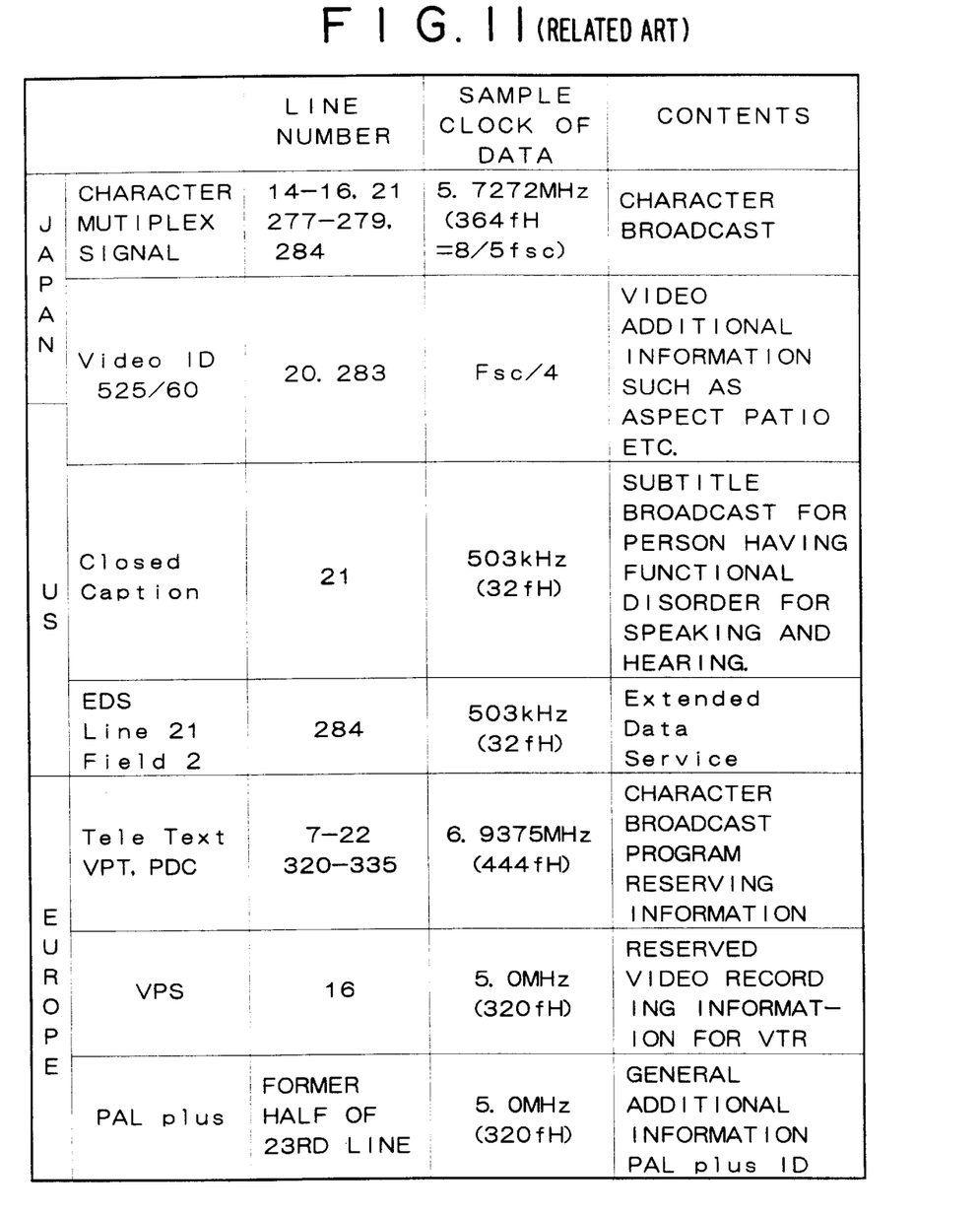
FIG. 11 is a diagram showing examples of the television broadcast services offered by multiplexing data in the vertical blanking period.

FIG. 11 shows examples of television broadcast services provided by multiplexing data in the horizontal section within the vertical blanking period.

As shown in FIG. 11, location (line number) of the horizontal section within the vertical blanking period in which the data is multiplexed, sampling clock frequency of data and contents of services are determined for each television broadcast service. These multiplex data are different not only in the horizontal section where data is multiplexed and sampling clock frequency but also in the encoding format.

Therefore, in the case of watching the television broadcast services shown in FIG. 11, a decoder for separately extracting multiplex data for decoding purpose is required depending on the television broadcast services to be watched.

As explained above, since a decoder for multiplex data has been required depending on each television broadcast service, manufacturers have also been required to provide a plurality kinds of decoders depending on respective television broadcast services. For example, when a decoder for multiplex data is mounted into a television receiver or video deck, the decoder must be changed depending on the country or areas where the apparatuses are used.

Moreover, it is desirable for users in the area where a plurality of television broadcast services can be received that users can watch these multiple television broadcast services, but different multiple decoders are required for such purpose and television receiver or video deck becomes expensive.

Therefore, a general purpose multiplex data extracting apparatus which can be used for various television broadcast services explained above is very convenient, if it is provided, for both manufacturers and users. Referring to FIG. 11, the data required for isolating and extracting multiplex data from the television signal are position of the horizontal section where data is multiplexed and sampling clock frequency of multiplex data. When these two pieces of information are fixed for each television broadcast service, various kinds of television broadcast services can be received by giving these two pieces of information to the multiplex data extracting apparatus depending on the television broadcast service to be received.

However, in the case of teletext shown in FIG. 11, the scope of the horizontal section where data is multiplexed is determined and data can be multiplexed in any horizontal section so long as it is defined in the above range. That is, since the horizontal section where data is multiplexed is not defined, data cannot be extracted in the method in which the horizontal section is required to be fixed for multiplexing of data.

Accordingly, it is thought to constitute a general purpose multiplex data extracting apparatus for the services, except for the television broadcast service where the horizontal section for multiplexing data is not fixed, as in the case of the teletext. However, in this case, flexibility of the apparatus becomes bad. Particularly, in the case of the teletext, various pieces of information other than the character broadcast such as current time, program ID of television program being broadcasted and broadcast station ID are offered through the multiplexing process. Since these data are very useful for users as will be explained hereunder, it is impossible to satisfy the requirements of manufacturer and users, even when the general purpose decoder is constituted, except for the teletext.

For example, when data of the television broadcast service by teletext can be extracted, the time indicated by the timer built in the video deck can be kept accurate with reference to the current time multiplexed on the signal.

Moreover, when video recording is reserved using a program ID and station ID which are data of teletext, even if the broadcast time is changed, the desired television program can be recorded accurately from the beginning to the end thereof.

Namely, for example, in the case of a relayed broadcast of baseball game from a stadium, the broadcast time is often extended considering the situation of the game. In the case when video recording of the program after the relayed broadcast of baseball game is reserved based on the broadcast time as is done in the related art, if the relayed broadcast of baseball game is extended, not only the unwanted video signal of the baseball game is recorded but also the wanted television program cannot be recorded accurately until the end thereof.

But, the wanted television program can be recorded accurately from the beginning to the end by extracting data of teletext to start the video recording from the timing when the wanted broadcast station ID and program ID are detected.

Therefore, it is desirable to use a general purpose decoder which can extract not only the data multiplexed in the fixed horizontal section but also the data of the television broadcast service of which horizontal section for multiplexing data is not fixed.

Especially, a general purpose decoder which can extract, for example, above-mentioned current time, program ID and broadcast station ID other than the character information of the teletext is very useful.

OBJECT AND SUMMARY OF THE PRESENT INVENTION

It is therefore an object of the present invention to provide a television multiplex data extracting apparatus which meets the requirements explained above.

According to the first profile of the television multiplex data extracting apparatus of the present invention, in view of overcoming the requirements explained above, there is provided a television multiplex data extracting apparatus for extracting multiplex data in the designated horizontal section among those in the vertical blanking period of the television signal comprising: mode designating means for designating the data fetch mode; data extracting means preparing for the first and second modes as the data fetch mode to separate and extract multiplex data in the designated horizontal section from the television signal; and memory means for storing output data from the data extracting means; whereby, the data extracting means extracts, when the first mode is designated by the mode designating means, the multiplex data in the designated horizontal section to transfer to the memory means; and the data extracting means discriminates, when the second mode is designated by the mode designating means, whether the multiplex data exists or not in the designated horizontal section and extracts the multiplex data, when it exists, and transfers this multiplex data to the memory means.

According to the second profile of the television multiplex data extracting apparatus of the present invention, there is provided the television multiplex data extracting apparatus explained in the first profile, wherein the data extracting means discriminates, when the second mode is designated, existence of the particular multiplex data in the designated horizontal section depending on existence of the predetermined data included in the particular multiplex data.

According to the third profile of the television multiplex data extracting apparatus of the present invention, there is provided the television multiplex data extracting apparatus explained in the first or second profile, wherein the data extracting means stores, when the second mode is designated and the multiplex data or the particular multiplex data is discriminated not to exist in the designated horizontal section, the predetermined data into the memory means corresponding to the designated horizontal section.

According to the fourth profile of the television multiplex data extracting apparatus of the present invention, there is provided the television multiplex data extracting apparatus explained in the second profile, wherein the designated multiplex data is teletext data and the data extracting means discriminates, when the teletext data is detected in the designated horizontal section in the second mode, whether the teletext data is transmitted by the character broadcast or not and extracts, when the teletext data is not transmitted by the character broadcast, the data after the packet number of the teletext data.

According to the fifth profile of the television multiplex data extracting apparatus of the present invention, there is provided the television multiplex data extracting apparatus explained in the fourth profile, wherein the data extracting means is further provided with a decoding means.

According to the sixth profile of the television multiplex data extracting apparatus of the present invention, there is provided the television multiplex data extracting apparatus explained in the fifth profile, wherein the decoding means is a Hamming decoder.

According to the seventh profile of the television multiplex data extracting apparatus of the present invention, there is provided the television multiplex data extracting apparatus explained in the sixth profile, wherein the Hamming decoder decodes, when the data following the designation code of the teletext data indicates the current time, the data of six(6) bytes following the designation code and also decodes, when data following the designation code indicates the program ID or the broadcast station ID, the data of 19 bytes following the designation code.

According to the eighth profile of the television multiplex data extracting apparatus of the present invention, there is provided the television multiplex data extracting apparatus explained in the first profile, wherein the data stored in the memory means is reset by the vertical synchronous signal of the television signal.

According to the ninth profile of the television multiplex data extracting apparatus of the present invention, there is provided the television multiplex data extracting apparatus explained in the second profile, wherein the data extracting means discriminates, when the data different within the predetermined bits from the predetermined data exists in the designated horizontal section, that the particular multiplex data exists.

According to the tenth profile of the television multiplex data extracting apparatus of the present invention, there is provided the television multiplex data extracting apparatus explained in the ninth profile, wherein the data extracting means adjusts slice level depending on the difference of data.

According to the eleventh profile of the television multiplex data extracting apparatus of the present invention, there is provided the television multiplex data extracting apparatus explained in the first profile, wherein an address register is further comprised to store the address of data stored in the memory means.

In the television multiplex data extracting apparatus of the first profile, the data extracting means detects the first mode or second mode in the horizontal section for fetching the multiplex data within the vertical blanking period from the information to designate the data fetch mode from the mode designating means.

The first mode corresponds to the case where the horizontal section in the vertical blanking period of the television signal where data is multiplexed is fixed. In the case of this first mode, the data extracting means always extracts the multiplex data in this horizontal section.

The second mode corresponds to the case where the horizontal section in the vertical blanking period of the television signal where data is multiplexed is not fixed. In the case of this second mode, the data extracting means discriminates first whether data is multiplexed or not in the relevant horizontal section. When data is multiplexed, necessary data is extracted. The extracted data is stored in the memory means in any of the first and second modes.

In the television multiplex data extracting apparatus of the second profile, the data extracting means discriminates, in the case of the second mode, existence or not existence of the particular multiplex data, for example, the teletext data in the relevant horizontal section. Such particular multiplex data is discriminated by detecting the predetermined data, for example, the framing code included in the particular multiplex data. When the particular multiplex data exists, the necessary data is stored in the memory means.

In the television multiplex data extracting apparatus of the third profile, the data extracting means stores, when the second mode is designated and the data is not multiplexed in the designated horizontal section, the alternative data in the memory means. Thereby, even when the first and second modes are designated in mixture, the storing address of the data extracted in the first mode can be detected easily.

In the television multiplex data extracting apparatus of the fourth profile, the particular multiplex data to be extracted is the teletext data. In this case, the data extracting means detects, in the case of the second mode, existence of the teletext data in the designated horizontal section. When existence of the teletext data is detected, the multiplex data is discriminated, from the packet number existing in the teletext data, whether it is the character broadcast data or the data other than the character broadcast such as the current time, program ID or broadcast station ID, etc. and the data other than the character broadcast is extracted.

In the television multiplex data extracting apparatus of the fifth profile, the data extracting means decodes the encoded teletext data.

In the television multiplex data extracting apparatus of the sixth profile, the decoder is a Hamming decoder and the data extracting means performs the Hamming decoding.

In the television multiplex data extracting apparatus of the seventh profile, the Hamming decoder alters the range of data to be decoded depending on the designation code included in the teletext data. When the data following the designation code indicates the current time, the data of six(6) bytes following the designation code is decoded and when the data indicates the program ID or broadcast station ID, the data of 19 bytes following the designation code is decoded.

In the television multiplex data extracting apparatus of the eighth profile, the data extracted and then stored in the memory means by the data extracting means is reset by the vertical synchronous signal of the television signal.

In the television multiplex data extracting apparatus of the ninth profile, the data extracting means discriminates that particular multiplex data exists when the data different within the predetermined bits from the predetermined data included in the particular multiplex data exists in the relevant horizontal section. For example, when the data different in one bit from the framing code is detected, the data including such data is discriminated as the teletext data.

In the television multiplex data extracting apparatus of the tenth profile, when the predetermined data, for example, the data different in one bit from the framing code is detected and when a value of the digit which should naturally be zero(0) is detected as one(1), the slice level for data extraction is raised but it is dropped in the opposite case.

In the television multiplex data extracting apparatus of the eleventh profile, an address register holds the address of data stored in the memory means and thereby necessary data can be read by making reference to the address register.

DESCRIPTION OF THE PREFERRED EMBODIMENT

A preferred embodiment of the television multiplex data extracting apparatus of the present invention will be explained with reference to the accompanying drawings.

This embodiment is an example of extracting not only the multiplex data where the horizontal section for multiplexing is fixed but also the multiplex data where the horizontal section for multiplexing is not fixed and moreover an example wherein the multiplex data in which the horizontal section to be multiplexed is not fixed is the teletext data explained above.

The teletext will be explained first.

As shown in FIG. 11, the teletext is the television broadcast service offered in the European countries. In this television broadcast service, the multiplexed information of the character broadcast is mainly broadcasted during the horizontal section of the vertical blanking period of the television signal, however, in some cases, the information such as the current time, program ID and broadcast station ID is formed as the multiplex data in addition to the character broadcast information.

In the case of the teletext, it is assumed that any horizontal section within the range of 7 to 22, 320 to 335 in the vertical blanking period for multiplexing data may be used as shown in FIG. 11. Moreover, the sampling clock frequency is determined as 6.937 MHz.

Figure 2:
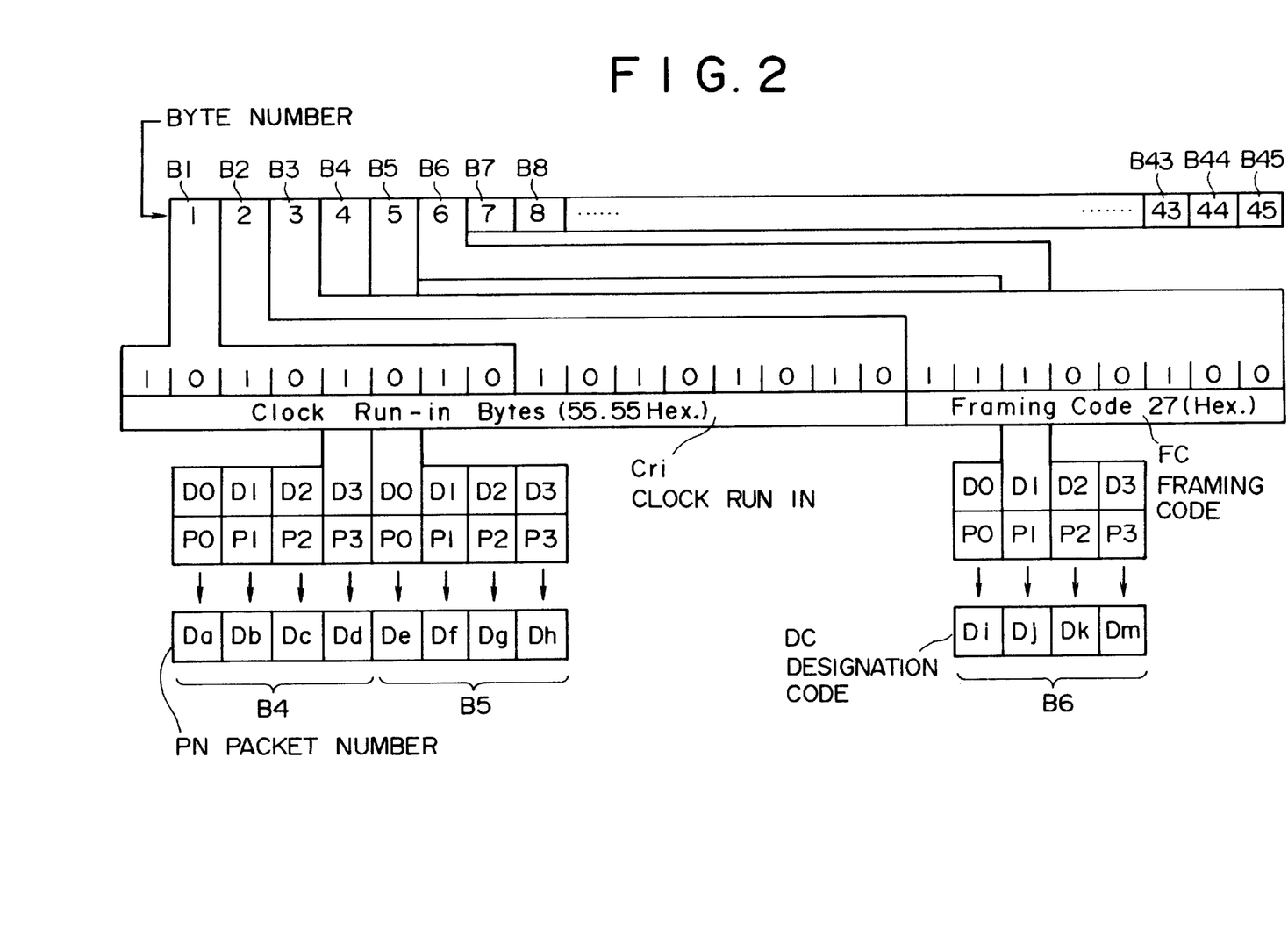
FIG. 2 is a diagram for explaining a format of teletext data.

FIG. 2 is a diagram for explaining a format of the multiplex data used for the teletext. As shown in FIG. 2, the teletext data is composed of first 2-byte data B1, B2 as the clock run-in Cri bytes, data B3 of the third byte as the framing code FC, data B4 and B5 of the fourth and fifth bytes as the packet number PN, data B6 of the sixth byte as the designation code DC, followed by the data B7 to B45 of the bytes after the seventh byte as the character broadcast data, current time, broadcasted program ID and broadcast station ID or the like.

Figure 3:
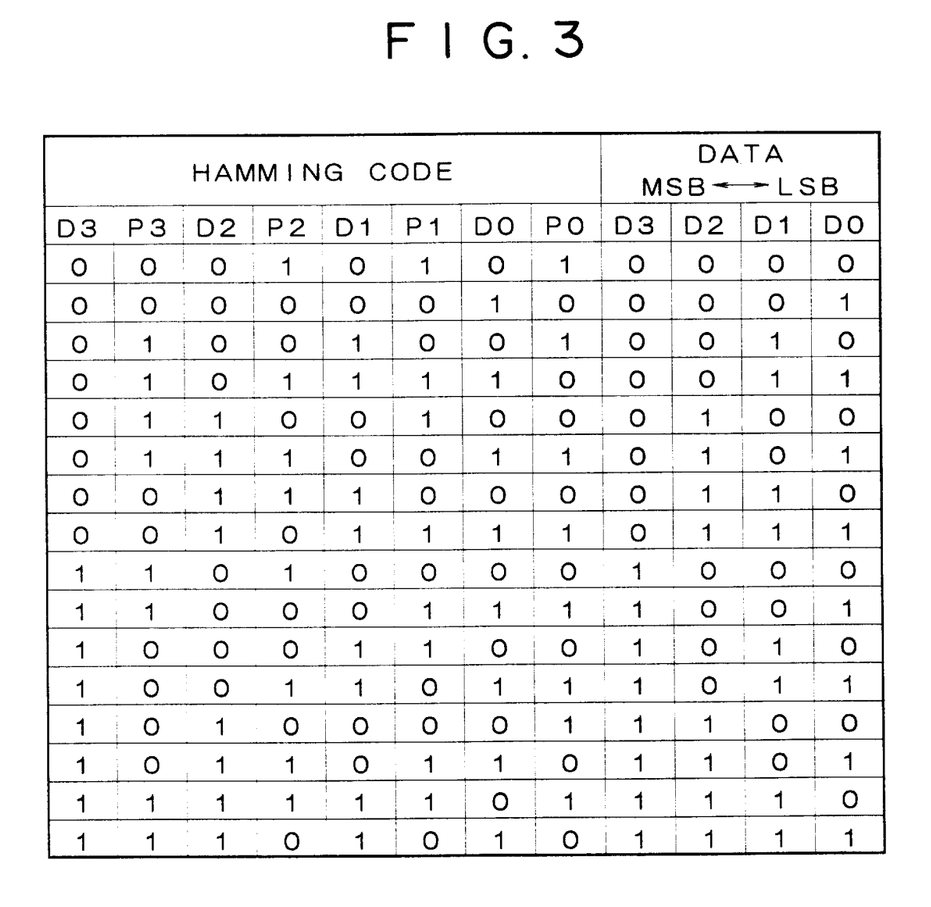
FIG. 3 is a diagram for explaining the Hamming code.

The data B4 to B45 after the packet number PN are transmitted after these are converted into the Hamming codes. FIG. 3 shows a Hamming code Table. For example, the data bits D0 to D3, "0000" of the four bits in the right side can be converted into the Hamming code of the eight(8) bits code "00010101" in the left side where the parity bits P0 to P3 are respectively interleaved between the data bits D0 to D3.

Therefore, the codes of eight(8) bits (one(1) byte) converted into the Hamming code include the parity bits as many as half bits and only four(4) bits may be transmitted with the data of one(1) byte. However, conversion into the Hamming code has a merit that transmission error of one bit can be corrected with the predetermined arithmetic operation.

The clock run-in Cri bytes are used for reproducing a clock signal synchronized with the data. The framing code FC indicates the beginning of the data and is used also for word synchronization (byte synchronization). For the framing code FC, a bit pattern which does not appear in the other data area is generally used.

Moreover, in the case of this example, the framing code FC is also used, as will be explained in detail, for adjustment of slice level required for binarizing process to extract the multiplexed data during the horizontal section.

A packet number PN is used for identifying that the multiplex data used is the data of the character broadcast or the other services.

Since the byte data B4, B5 forming the packet number PN are respectively converted into the Hamming codes, the data Da, Db, Dc, Dd of four(4) bits can be obtained by the Hamming decoding for the byte data B4, while the data De, Df, Dg, Dh of four(4) bits for the byte data B5.

The packet where these bit data Da to Dh are defined as

Da=0, Db=0, Dc=0, Dd=0

De=1, Df=1, Dg=1, Dh=1 is defined in the teletext as the packet of the information of the services other than the character broadcast. This packet is hereinafter referred to as the packet 8/30.

The packet 8/30 is transmitted for five(5) times within a second, but it is not yet determined in which horizontal section among those allowing multiplexing of data in the vertical blanking period the teletext data is multiplexed.

Two kinds of formats are prepared for the packet 8/30. Namely, there are provided the first format (referred to as the format 1) which is used for mainly transmitting the current time and the second format (referred to as the format 2) which is used for transmitting the broadcasted program ID and broadcast station ID, etc.

The designation code DC designates the format 1 or format 2. This designation code DC is transmitted after conversion into the Hamming code as in the case of the packet number PN and is then decoded by the Hamming decoding method to provide the data Di, Dj, Dk, Dm (refer to FIG. 2) of four(4) bits. The designation code DC designates the formats as indicated below depending on the data Di to Dm of four(4) bits.

Format 1, when Di=0, Dj=0, Dk=0, Dm=0

Format 2, when Di=0, Dj=1, Dk=0, Dm=0

In the case of format 1, the data indicating the current time is multiplexed and the seventh to twelfth bytes following the designation code DC are converted into the Hamming codes and are then multiplexed. In the format 2, the data indicating the program ID and broadcast station ID are multiplexed and the seventh to twelfth bytes are converted into the Hamming codes and are then multiplexed.

Figure 4:
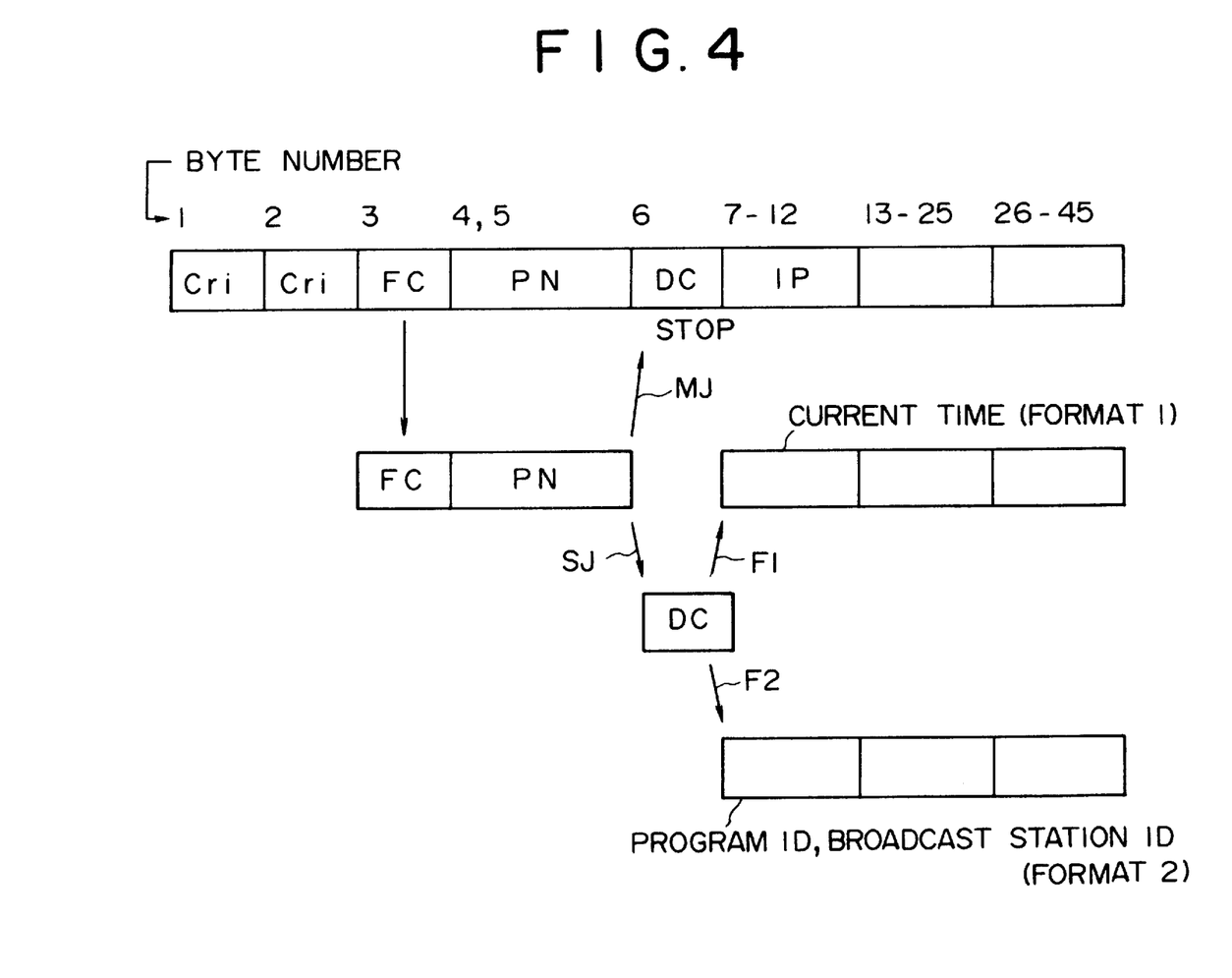
FIG. 4 is a diagram for explaining teletext data.

Therefore, in the case of the teletext, when the framing code FC of one(1) byte is detected following the clock run-in Cri bytes as shown in FIG. 4, the subsequent data can be extracted. The packet number PN of two(2) bytes following the framing code FC discriminates whether the subsequent data is the data of character broadcast service or the other services.

When the packet number PN discriminates that the subsequent data is the data of the services other than the character broadcast, the designation code DC of one(1) byte following the packet number PN is decoded as shown by the arrow mark SJ in FIG. 4. Depending on the result of decoding, the subsequent data can be discriminated as the data of any format of the formats 1 and 2. When the subsequent data is the data of format 1, the current time is decoded as indicated by the arrow mark F1. When it is the data of format 2, the broadcasted program ID and broadcast station ID are decoded as indicated by the arrow mark F2.

When the packet number PN indicates the packet of the character broadcast, extraction of data is suspended, as will be explained later, at this time as indicated by the arrow mark MJ in this example.

As explained previously, when the framing code FC, packet number PN and designation code DC can be detected, it is possible to extract and fetch only the information required such as current time, broadcasted program ID and broadcast station ID, etc.

Thereby, the process for searching the necessary information and using it after all data in the horizontal section where the teletext data may be multiplexed are fetched to the memory is no longer required.

Figure 1:
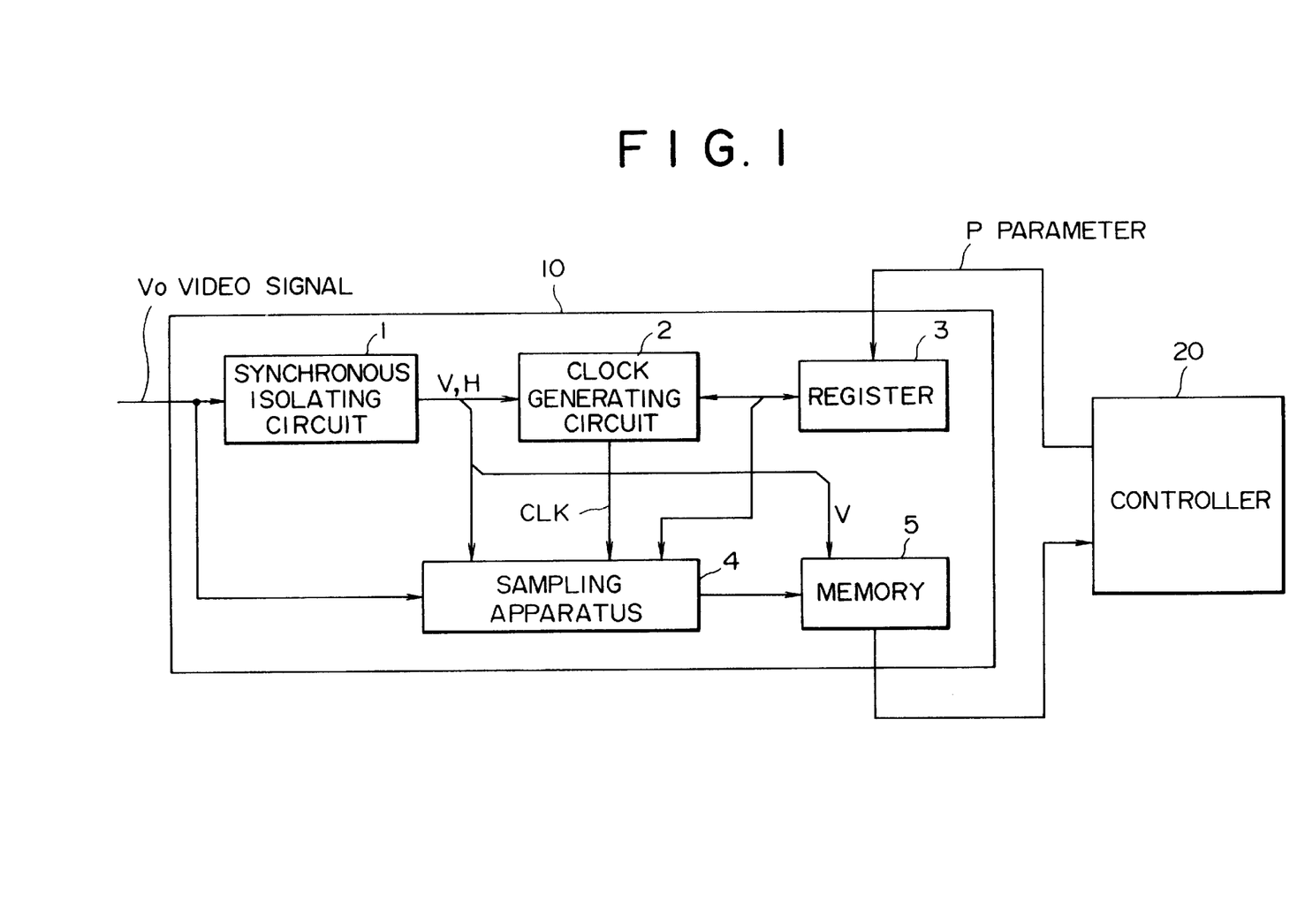
FIG. 1 is a block diagram for explaining an embodiment of a television multiplex data extracting apparatus of the present invention.

Next, an example of constitution of the general purpose decoder comprising the television multiplex data extracting apparatus of this embodiment is shown in FIG. 1.

The general purpose decoder of this example is composed of a television multiplex data extracting apparatus (hereafter referred to as data extracting apparatus) 10 and a controller 20. The controller 20 offers the information required for extraction of the multiplex data for the data extracting apparatus 10. The controller 20 further executes necessary decoding process and the other similar processes by receiving the multiplex data extracted by the data extracting apparatus 10.

The data extracting apparatus 10 isolates and extracts, as will be explained later, the multiplex data from the television signal, depending on various pieces of information from the controller 20.

In the general purpose decoder in the example of FIG. 1, the controller 20 can designate "Fetch of multiplex data" and "No-fetch of multiplex data" for every horizontal section in the vertical blanking period.

For the horizontal section to which "Fetch of multiplex data" is designated, the controller 20 selects any one of the first mode (hereinafter referred to as the normal mode) and second mode (hereinafter referred to as the PDC mode).

In the normal mode, the multiplex data of the designated number of bytes is extracted in the horizontal section which is fixedly designated in the vertical blanking period. When the controller 20 selects the normal mode, it also designates the sampling frequency of the multiplex data to be extracted, the number of bytes to be fetched and slice level of data. The sampling frequency, number of bytes to be fetched and slice level can be designated automatically by designating the kind of television broadcast services.

Moreover, in the PDC mode, only the teletext data of the packet 8/30 is extracted. In the horizontal section designated as the PDC mode, the data extracting apparatus detects whether the data is the teletext data and is the data of the packet 8/30 or not when not only existence or not existence of the multiplex data is detected but also existence of the multiplex data is detected.

Designation of "Fetch of multiplex data" or "No-fetch of multiplex data" for each horizontal section in the vertical blanking period and designation of normal mode or PDC mode are transferred to the data extracting apparatus from the controller 20 with the parameters explained later.

A user or a service man preforms above designation to the controller 20, through, for example, the operation panel and remote control commander of the apparatus, for example, a video deck to which the general purpose decoder is mounted.

It is also possible that a maker previously executes such designation to the controller 20. In this case, designation by user or service man is unnecessary.

The controller 20 supplies, as shown in FIG. 1, various kinds of parameters P to the data extracting apparatus 10, depending on the above designation.

These parameters P include various pieces of information such as a line number indicating the horizontal section to which "Fetch of multiplex data" is designated, mode designation for normal mode or PDC mode, sampling clock frequency of the relevant data, number of bytes to be fetched and slice level of data, etc.

Meanwhile, the data extracting apparatus 10 comprises a synchronous isolation circuit 1, a clock generating circuit 2, a register 3, a sampling apparatus as the data extracting apparatus 4 and a memory 5.

Various pieces of parameters P from the controller 20 explained above are supplied to the register 3 and then held therein.

The synchronous isolating circuit 1 receives a video signal Vo, isolates the vertical synchronous signal V and horizontal synchronous signal H from the video signal Vo and then supplies these signals to the clock generating circuit 2.

The clock generating circuit 2 is composed of a PLL circuit and forms a sampling clock signal by receiving the parameters regarding the sampling clock frequency set from the register 3. This sampling clock signal formed is synchronized with the vertical synchronous signal V and horizontal synchronous signal H and is matched with the sampling clock frequency set in the register 3. Here, the sampling clock signal CLK formed is then supplied to the sampling apparatus 4.

Here, it is also possible to form the sampling clock signal CLK in the clock generating circuit 2 using the clock run-in Cri bytes of the multiplex data.

The sampling apparatus 4 receives the video signal Vo, sampling clock signal CLK and parameters P from the register 3 to execute the data extracting process in the horizontal section where "Fetch of multiplex data" is designated with the parameters P.

To the sampling apparatus 4, the parameters P indicating the horizontal section for fetching multiplex data in the vertical blanking period, mode designation, number of bytes of data to be fetched and slice level of data are supplied from the register 3. The sampling apparatus 4 slices the video signal Vo to obtain the binary data depending on the slice level designated by the parameters in the horizontal section designated by the parameters.

When the normal mode is designated, the sampling apparatus 4 samples the multiplex data as many as the number of designated bytes. The sampled data are supplied to the memory 5.

As described above, the data extracting apparatus 10 of this embodiment samples and fetches, in the normal mode, the data multiplexed in the horizontal section to which "Fetch of multiplex data" is designated by the parameters set in the register 3 as many as the designated number of bytes and then stores such multiplex data into the memory 5. Thereby, the data extracting apparatus 10 can decode and fetch the data of various kinds of television broadcast services which are multiplexed in the particular horizontal section by changing the parameters to be set to the register 3.

Next, when PDC mode is designated, the sampling apparatus 4 searches the framing code of teletext in the binarized data stream. When the framing code is not detected, the sampling apparatus 4 judges that the data to be multiplexed of the teletext is not multiplexed in the relevant horizontal section.

In this embodiment, existence or not existence of the teletext data is discriminated by existence or not existence of the framing code. The present invention is not limited thereto and covers every system so long as existence or not existence of the particular multiplex data in the relevant horizontal section is discriminated depending on existence or not existence of the predetermined data.

When the framing code is detected, the sampling apparatus 4 decodes the subsequent two(2) bytes by the Hamming decoding method to fetch the packet number. In accordance with this packet number, the sampling apparatus 4 judges whether the relevant packet is the packet 8/30 or not. If it is not the packet 8/30, the successive processes are suspended.

When the relevant packet is the packet 8/30, the sampling apparatus 4 extracts the data of the necessary number of bytes and then transfers this data to the memory 5.

The memory 5 receives the sampled data (binary data) from the sampling apparatus 4 and holds this data. The data held in the memory 5 is then read out, as explained previously, by the controller 20 and used for various processings. Moreover, the memory 5 is reset in such a timing that it receives the vertical synchronous signal V.

Next, operations in the PDC mode will then be explained in detail. The general purpose decoder of FIG. 1 operates in the similar manner for the normal mode and PDC mode in its each circuit other than the sampling apparatus 4. Therefore, following explanation will be made mainly for the sampling apparatus 4.

Figure 5:
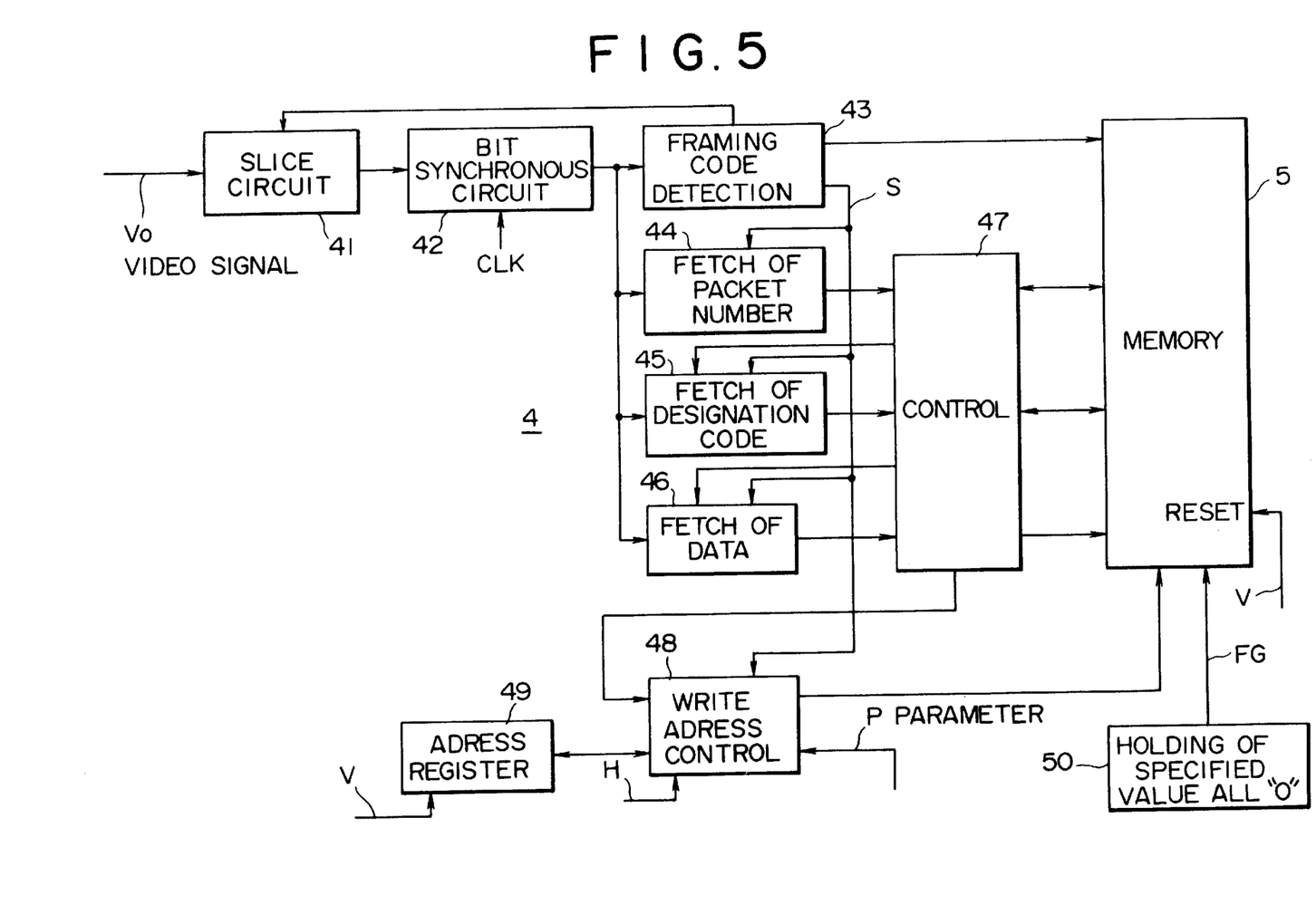
FIG. 5 is a diagram for explaining an example of the essential portion of an embodiment of the television multiplex data extracting apparatus of the present invention.

FIG. 5 is a block diagram showing principal functions of the sampling apparatus 4 for fetching the teletext data in the PDC mode.

As shown in FIG. 5, the sampling apparatus 4 in this embodiment comprises a slice circuit 41, a bit synchronous circuit 42, a framing code detecting circuit 43, a packet number fetch circuit 44, a designation code fetch circuit 45, a data fetch circuit 46, a control circuit 47, a write address control circuit 48, an address register 49 and a designated value holding means 50.

The slice circuit 41 receives a video signal Vo and slices this signal depending on the slice level information from the register 3. Thereby, the slice circuit 41 converts the data multiplexed to the video signal into the binary signal to supply it to the bit synchronous circuit 42.

The bit synchronous circuit 42 converts the binary data into the data synchronized with the sampling clock CLK from the clock generating circuit 2 explained above. The data from the bit synchronous circuit 42 is supplied respectively to the framing code detecting circuit 43, packet number fetch circuit 44, designation code fetch circuit 45 and data fetch circuit 46.

The framing code detecting circuit 43 detects whether eight(8) bits of the third byte of the data multiplexed in the horizontal section form the predetermined bit pattern ("11100100" in FIG. 2) or not. That is, the framing code detecting circuit 43 detects existence or not existence of the framing code FC.

When the third byte is detected as the framing code FC, the framing code detecting circuit 43 supplies the relevant framing code FC to the memory 5. The framing code detecting circuit 43 supplies the signal S indicating the detecting point of the framing code FC and existence of the framing code FC to the packet number fetch circuit 44, designation code fetch circuit 45, data fetch circuit 46 and write address control circuit 48.

The framing code FC supplied to the memory 5 is written into the predetermined address of the memory by the write address control circuit 48.

If the framing code FC is not detected, the write address control circuit 48 writes the data FG of one(1) byte supplied from the designated value holding means 50 into the memory 5 in place of the framing code FC. The data FG indicates that the teletext data does not exist in the relevant horizontal section. In this example, eight(8) bits are all "0" in the data FG.

The above-mentioned packet number fetch circuit 44, designation code fetch circuit 45 and data fetch circuit 46 which have received the signal S indicating the timing for detection and existence of the framing code FC further fetch respectively the packet number PN, designation code DC and other data shown in the data format of FIG. 2.

The packet number fetch circuit 44 extracts the fourth and fifth packet numbers PN from the beginning of the data multiplexed in the relevant horizontal section and then supplies these data to the control circuit 47.

The control circuit 47 decodes the packet number PN supplied by the Hamming decoding method and extracts, as explained above, the data Da to Dd of four(4) bits from the 8-bit data of the fourth byte and the data De to Dh of four(4) bits from the 8-bit data of the fifth byte. The control circuit 47 discriminates whether the relevant packet is the packet 8/30 or not, using the extracted data Da to Dh.

When the control circuit 47 judges the relevant packet is the packet 8/30, the packet number PN decoded by the Hamming decoding method is then supplied to the memory 5. The write address control circuit 48 receives the designation from the control circuit 47 and then writes the packet number PN to the memory 5.

When the control circuit 47 judges that the relevant packet does not the packet 8/30, the packet number PN is not stored in the memory 5 and the subsequent processes are suspended.

The designation code fetch circuit 45 extracts the designation code DC of the sixth byte (refer to the data format of FIG. 2) from the beginning of the data multiplexed in the relevant horizontal section. The control circuit 47 decodes the designation code by the Hamming decoding method.

Using the decoded designation code DC, the control circuit 47 discriminates whether the relevant multiplexed data is the data of the format 1 or format 2. In the case of the format 1, as described above, the subsequent data indicates the current time, while in the case of the format 2, the subsequent data indicates the program ID or broadcast station ID. The write address control circuit 48 receives the designation from the control circuit 47 and writes the designation code DC into the memory 5.

In this timing, the address on the memory 5 to which the designation code DC is written is supplied to the address register 49 from the write address control circuit 48 and is then stored and held therein. The address of this address register 49 indicates that the necessary data, for example, the current time or program ID and broadcast station ID, in this case, is fetched and is used also for quickly reading out these data.

Moreover, the control circuit 47 writes the designation code DC to the memory 5 and thereafter issues an instruction to the data fetch circuit 46 to fetch the data of the seventh and subsequent bytes from the beginning of the data multiplexed in the relevant horizontal section.

At the time of this data fetch, the control circuit 47 decodes, when the subsequent data of the designation code DC is the data of format 1, the data of six(6) bytes from the 7th byte to 12th byte from the beginning of the multiplexed data by the Hamming decoding method.

Moreover, the control circuit 47 decodes, when the subsequent data of the designation code DC is the data of format 2, the data of the 19 bytes from the 7th byte to the 25th byte from the beginning of the multiplexed data by the Hamming decoding method.

The data decoded by the Hamming decoding method and the data fetched subsequently are written into the memory 5 by the write address control circuit 48.

In the case of this example, the memory 5 and address register 49 are reset by the vertical synchronous signal V. In addition, the write address control circuit 48 receives the horizontal synchronous signal H, parameter indicating the horizontal section as the search object from the register 3 and a mode designating parameter from the register 3 to detect the horizontal section under the PDC mode. For instance, the write address control circuit 48 judges the areas defined by the 7th to 22nd lines and the 320th to 335th lines as the horizontal sections in the PDC mode.

The framing code detecting circuit 43 detects the framing code of eight(8) bits in the predetermined bit pattern. In this embodiment, the framing code detecting circuit 43 further judges the code as the framing code FC when at least seven(7) bits thereof are in the same bit pattern and then fetches this code into the memory 5.

The framing code detecting circuit 43 adjusts, when it fetches the framing code FC which is different only in one(1) bit, the slice level of the slice circuit 41 depending on difference of the bit.

With adjustment of the slice level, the data is properly converted to the binary data.

When the data is fetched in the PDC mode, if no data other than the current time, program ID and broadcast station ID is fetched, it cannot be discriminated whether there is no data or the slice level is not adequate, when data such as current time, program ID or broadcast station ID is not fetched.

However, in the case of this embodiment, since the framing code FC is always fetched to the memory 5 whenever it is detected, if there is no current time, program ID or broadcast station ID information, it can be understood that the slice level is always set to the level suitable for fetching the data.

Figure 6A:
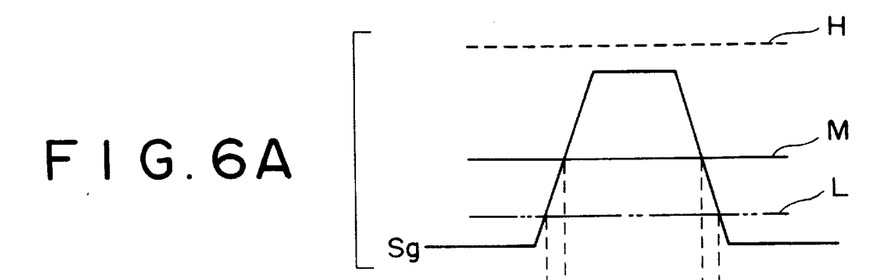
FIGS. 6A to 6D are diagrams for explaining operation of an embodiment of the television multiplex data extracting apparatus of the present invention.
Figures 6B, 6C:
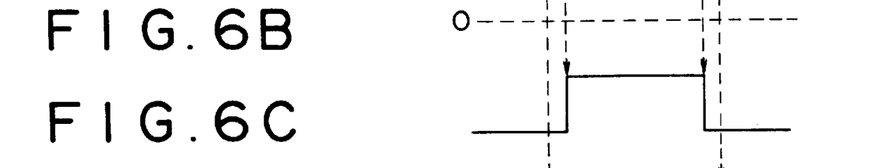
Figure 6D:
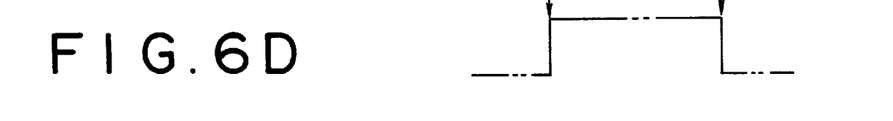

For instance, as shown in FIG. 6A, when the slice level is indicated by the dotted line H, the signal Sg cannot be sliced even when the signal is converted to the binary signal and the signal Sg indicating "1" is converted to "0" as shown in FIG. 6B. Moreover, when the slice level is set to a low level as indicated by the chain line L, the section indicating "0" is detected as "1" as shown in FIG. 6D.

Therefore, when the data which is different by one(1) bit from the framing code FC is detected, if the bit which should naturally be "0" is detected as "1", the slice level is raised and in the contrary case, the slice level is lowered through the control. Thereby, the slice level can be adjusted to the adequate level, that is, the level indicated by a solid line M of FIG. 6A to obtain the adequate binary data as shown in FIG. 6C.

Depending on detection of the framing code FC, the slice level can be controlled adequately.

As described, the data extracting apparatus 10 in this embodiment automatically detects, by selecting the PDC mode, the horizontal section in which the necessary information such as the current time, program ID and broadcast station ID is multiplexed and thereby fetches only the necessary information.

Even in the case of teletext, since it is no longer required to process and fetch all data in the horizontal section where the data may be multiplexed, a memory having smaller capacity may be used.

Next, a practical example will be explained for data fetch by the data extracting apparatus 10 of this embodiment utilizing the sampling apparatus 4.

Figure 7:
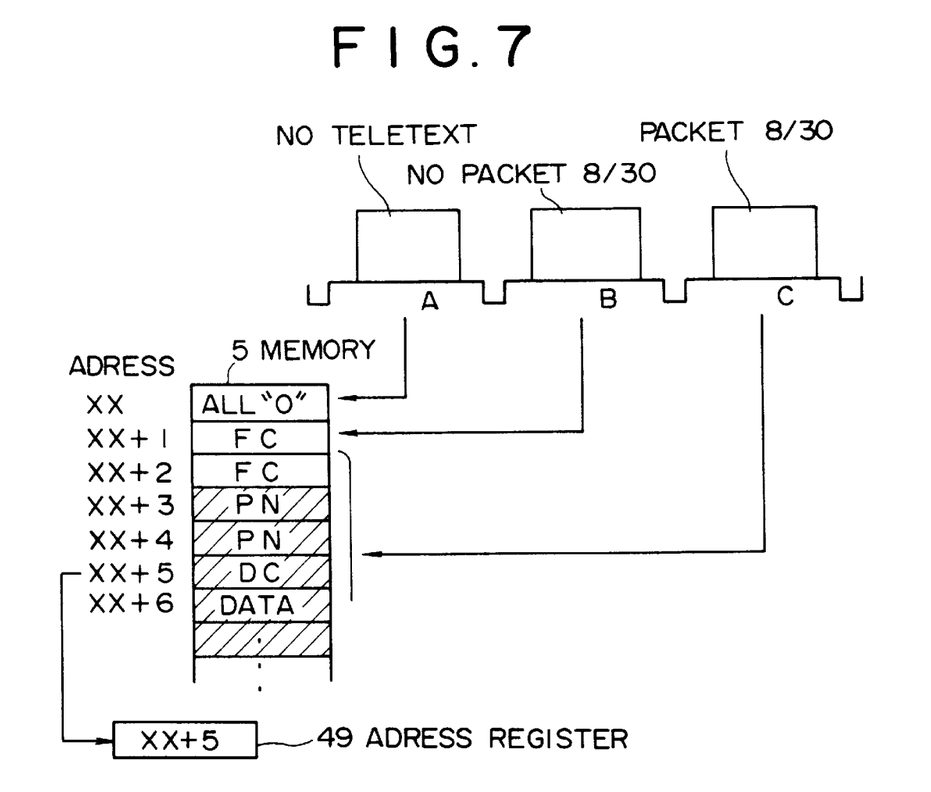
FIG. 7 is a diagram for explaining data fetch process performed by an embodiment of the television multiplex data extracting apparatus of the present invention.

For example, as shown in FIG. 7, it is assumed here that the horizontal section A where the data other than the teletext data is multiplexed, the horizontal section B where the data which is the teletext data but the character broadcast data is multiplexed and the horizontal section C where the data which is the teletext data and the data of packet 8/30 is multiplexed are all designated in the PDC mode.

First, since the data multiplexed in the horizontal section A is not the teletext data, the framing code FC is not detected. Therefore, as explained above, the write address control circuit 48 writes the data FB where eight(8) bits of one(1) byte are all consisting of "0" to the address "XX", for example, of the memory 5.

The data multiplexed in the horizontal section B is the teletext data and also the character broadcast data. The write address control circuit 48 writes the framing code FC to the address "XX+1" of the memory 5. Since the packet number PN indicates that the character broadcast data is multiplexed, the subsequent data is not fetched, completing the process for fetching the data in the relevant horizontal section.

The data multiplexed in the horizontal section C is the teletext data and is the data of packet 8/30. The write address control circuit 48 writes the framing code FC to the address "XX+2" of the memory 5 and also writes the packet number PN to the addresses "XX+3" and "XX+4" of the memory 5. Moreover, the write address control circuit 48 writes the designation code DC to the address "XX+5" of the memory 5 and the data as many as the predetermined number of bytes following the designation code DC to the address "XX+6" of the memory 5.

In this case, the address "XX+5" on the memory 5 to which the designation code DC is written is written into the address register 49 and is then held therein.

Each data stored in the addresses after the address "XX+3" is decoded by the Hamming decoding method as explained above.

As explained above, the general purpose decoder in this embodiment detects the horizontal section where the wanted data is multiplexed and extracts the data multiplexed in this horizontal section. Moreover, since the address on the memory 5 to which the designation code DC is written is held in the address register 49, the necessary data can be read out quickly using this address. Further, when the designation code DC is not written into the memory 5, if a value of the address register 49 is set as the address not conceivable (for example, "0"), it can be understood that the data of packet 8/30 has not been extracted, by making reference to this address.

Moreover, the data fetched can be detected whether it is the current time, broadcasted program ID or broadcast station ID by reading the designation code DC with the address held in the address register 49 and then confirming the content thereof.

As shown in FIG. 7, the general purpose decoder in this embodiment also writes the data "0" of one(1) byte when the teletext data is not multiplexed in the horizontal section where "Fetch of multiplex data" is designated and moreover in the horizontal section where the PDC mode is selected. Thereby, when the PDC mode and normal mode are designated in mixture within one frame, the storing area on the memory 5 of the data fetched in the normal mode can always be detected accurately.

For example, when predetermined horizontal sections after the line number 15 within the vertical blanking period is selected as the normal mode and the horizontal section in the line numbers 7 to 14 is selected as the PDC mode, the data of the horizontal section selected as the normal mode can be quickly extracted from the memory 5.

In this case, if the data FG and framing code FC are not written into the memory 5 when there is no multiplex data or the data is not the data of packet 8/30, the storing area on the memory 5 of the data fetched in the normal mode changes depending on the number of horizontal sections, where the data of packet 8/30 is multiplexed, among the lines numbers 7 to 14.

In such a case, the data fetched in the normal mode cannot be found if it is not searched from the beginning of the memory 5. Otherwise, an extra-memory is required because the address pointer indicating the storing area of data fetched in the normal mode must be written.

Figure 8:
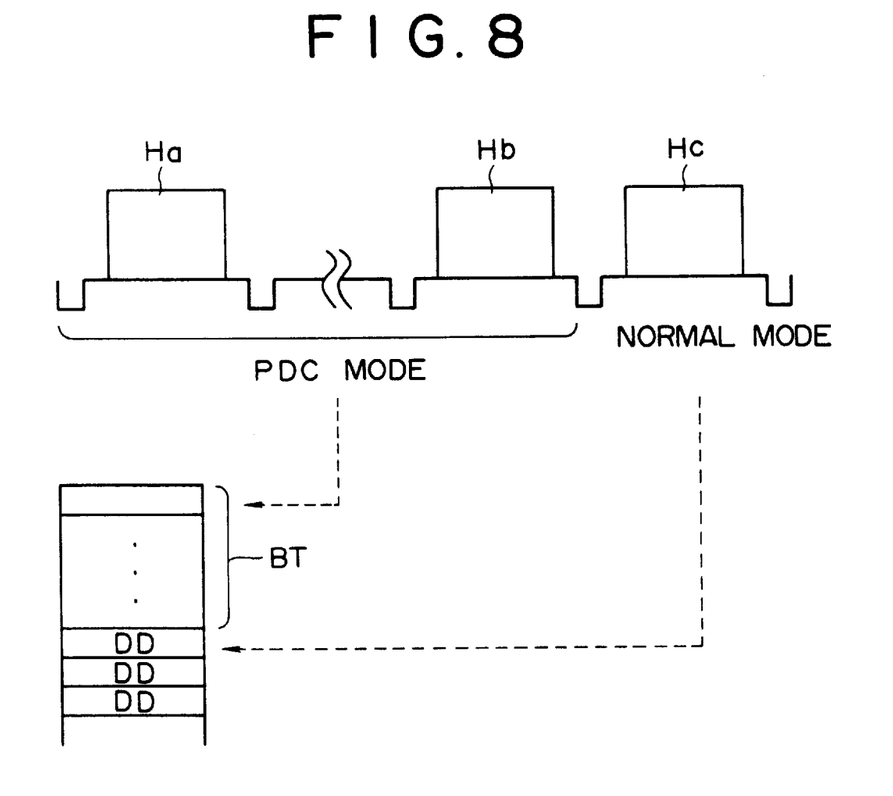
FIG. 8 is a diagram for explaining the process when the first and second modes are designated in mixture in an embodiment of the television multiplex data extracting apparatus of the present invention.

Here, FIG. 8 shows profile where the horizontal sections from Ha to Hb are selected as the PDC mode, while the subsequent horizontal section Hc is selected as the normal mode. When there is no data of the packet 8/30, the write address control circuit 48 writes, as explained previously, the data FG or the framing code FC into the memory 5. Thereby, the number of bytes of the memory used in the PDC mode can be obtained by the calculation as indicated below and the storing area of the data fetched in the normal mode can always be detected accurately.

Namely, for example, if the data of packet 8/30 is not multiplexed in any section of the horizontal sections Ha to Hb in the PDC mode, the number of bytes BT used in the horizontal sections Ha to Hb can be obtained from the following equation.

$$\text{Number of bytes BT}=1\times\text{number of lines designating PDC mode} \quad (1)$$

Moreover, the data of the packet 8/30 is multiplexed in one horizontal section among those in which data is fetched in the PDC mode and the number of bytes BT of the memory used when the necessary data is fetched can be obtained from the following equation.

$$\text{Number of bytes BT}=1\times(\text{number of lines designating PDC mode}-1)+\text{number of bytes fetched designated by the PDC mode}) \quad (2)$$

In above equations (1), (2), the number of lines designating the PDC mode is supplied by the controller 20 as the parameter to the data extracting apparatus 10, but the "number of bytes fetched designated by the PDC mode" is also supplied by the controller 20 as the parameter to the data extracting apparatus 10.

Whether the data such as current time, program ID and broadcast station ID is fetched or not can be recognized by making reference to the address register 49 explained above.

Thereby, as shown in FIG. 8, the read address control circuit, for example, not illustrated can obtain the number of bytes BT of the memory 5 used in the process of the PDC mode through the arithmetic calculation. Moreover, the storing area on the memory 5 of the data DD multiplexed in the horizontal section Hc fetched in the normal mode, following the memory area used by the process in the PDC mode can also be detected accurately.

As explained above, since the memory 5 can be used both in the PDC mode and normal mode, it is not required to use independent memories for both operation modes.

In this embodiment, since the memory 5 is cleared in the timing that the vertical synchronous signal V is supplied, the data extracting apparatus 10 can fetch the data in every vertical blanking period.

Figure 9:
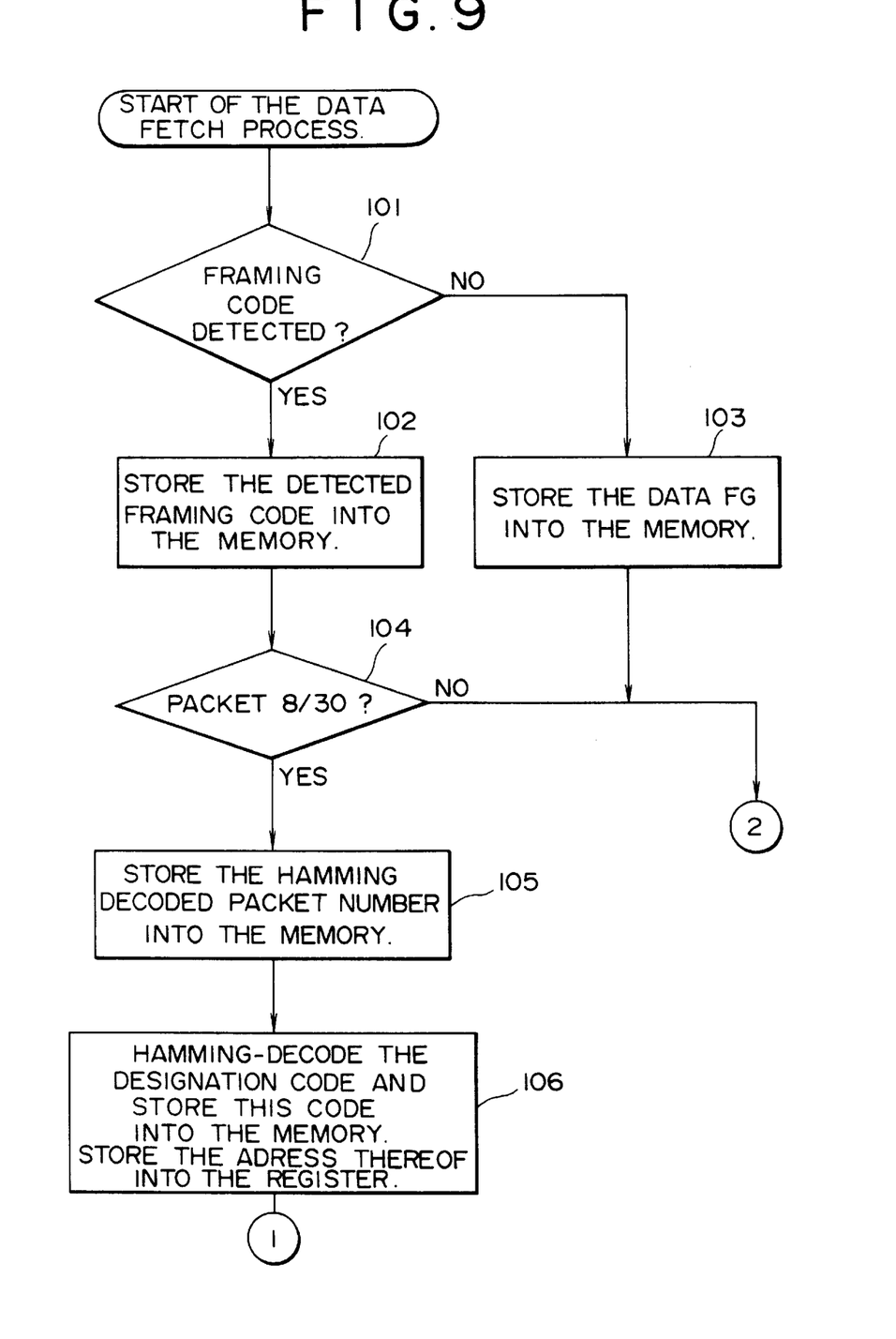
FIG. 9 is a flowchart for explaining operations of the essential portion of an embodiment of the television multiplex data extracting apparatus of the present invention.
Figure 10:
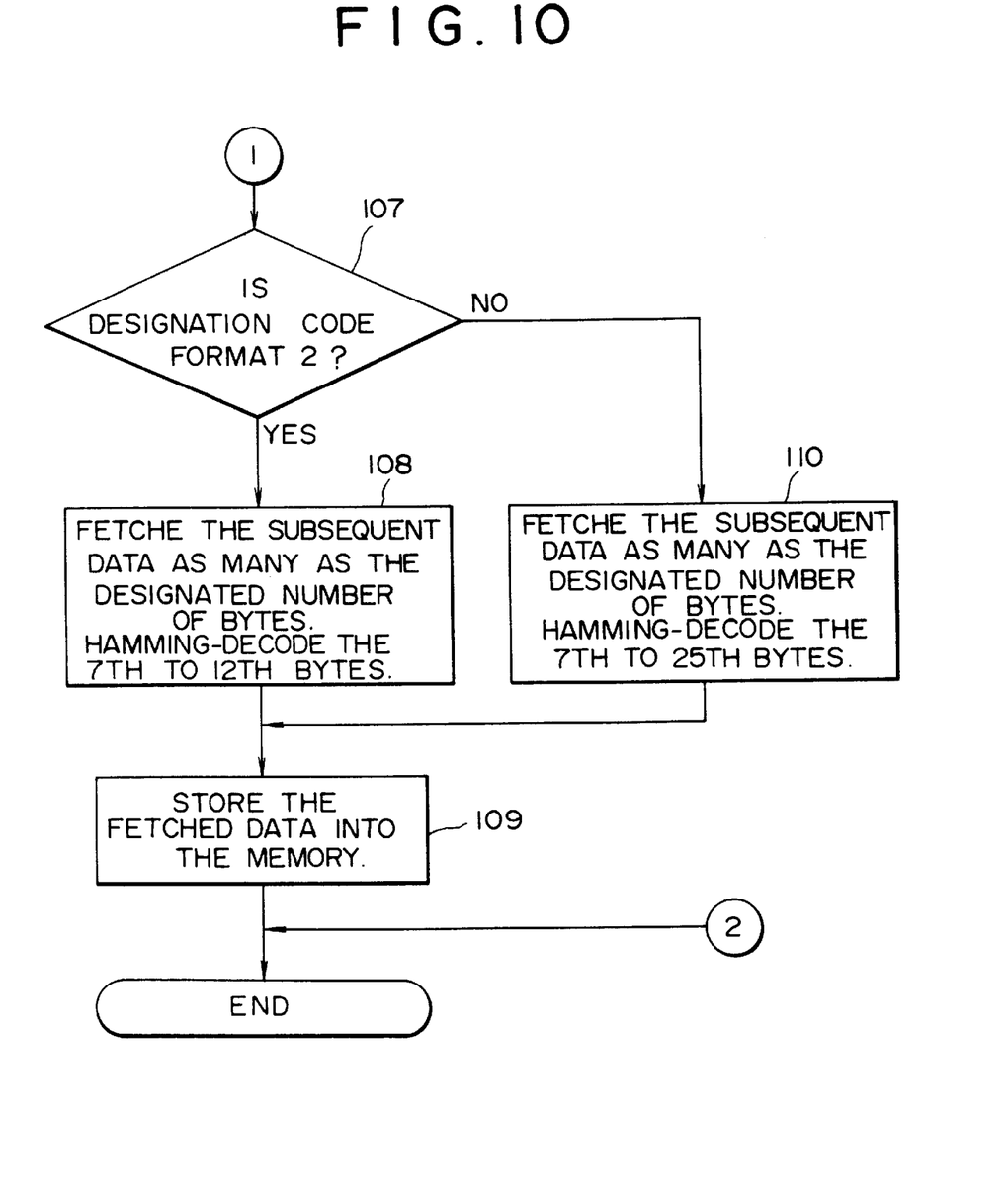
FIG. 10 is a flowchart, following FIG. 9.

FIG. 9 and FIG. 10 are flowcharts indicating operations of the sampling apparatus 4 in the PDC mode explained above.

The data extracting apparatus 10 of this embodiment slices the supplied video signal and synchronizes the multiplexed data and sampling clock signal to detect the framing code FC of the third byte of the multiplexed data (Step 101).

When the framing code FC is not detected in the process of the step 101, the sampling apparatus 4 writes "0" as the data FG as many as one byte into the memory 5 (step 103) to complete the data fetch process.

When the framing code FC is detected in the process of step 101, the sampling apparatus 4 writes the detected framing code FC into the memory 5 (step 102). Next, the sampling apparatus 4 decodes the packet numbers PN of the fourth and fifth bytes from the beginning of the multiplexed data to judge whether the decoded packet numbers PN indicate or not the packet 8/30 (step 104).

When the sampling apparatus 4 judges in the step 104 that the multiplexed data packet does not indicate the packet 8/30, it completes the data fetch process. When the sampling apparatus 4 judges in the step 104 that the multiplexed data packet indicates the packet 8/30, it writes the decoded packet numbers PN into the memory 5 (step 105).

Next, the sampling apparatus 4 detects the designation code DC of the sixth byte from the beginning of the multiplexed data and decodes this designation code DC. Successively, the sampling apparatus 4 writes the decoded designation code DC into the memory 5 and stores the address of the area to which the designation code DC is written into the address register 49 (step 106).

The sampling apparatus 4 judges, from the decoded designation code DC, whether the multiplexed data has the format 1 or 2 (step 107).

When the sampling apparatus 4 judges, in the step 107, the multiplexed data has the format 2, it fetches the data of the seventh and subsequent bytes from the beginning of the multiplexed data, decodes the data as many as 19 bytes from the seventh to 25th bytes (step 108) and also writes the decoded data into the memory 5 (step 109).

When the sampling apparatus 4 judges in the step 107 that the multiplexed data does not have the format 2, it fetches the data of seventh and subsequent bytes from the beginning of the multiplexed data, decodes the data as many as six(6) bytes from the seventh byte to 12th byte (step 110) and writes the decoded data into the memory 5 (step 109).

The information indicating the current time fetched into the memory as explained above can be used, for example, for adjusting the the current time of the timer built in the video deck.

In addition, the broadcasted program ID and broadcast station ID fetched into the memory 5 are used, for example, for reservation of video recording as explained previously and can also be used for control to start the video recording when the preset program ID is detected.

Thereby, sudden change of the broadcast time can also be covered by managing the reservation for video recording based on the program ID and broadcast station ID, in place of management based on the recording time which is introduced in the related art.

As explained, the data extracting apparatus 10 of this embodiment can fetch both data of the television broadcast service where the horizontal section for multiplexing data is not fixed and data of the television broadcast service where the horizontal section for multiplexing data is fixed.

In this embodiment, designation for "Fetch of data" or "No fetch of data" and selection for the first mode or second mode when designation for "Fetch of data" is made are executed in every horizontal section in the vertical blanking period, but such designation and selection may also be executed for continuous horizontal sections.

Moreover, in above embodiment, the general purpose decoder has been explained as an example that it is built into the video deck but it may also be built into a television receiver or the other electronic apparatuses. In addition, it is also possible that the general purpose decoder is designed to have a constitution of the adapter.

As explained previously, the television multiplex data extracting apparatus of the present invention can be used for multiple kinds of television broadcast services wherein the horizontal sections for multiplexing data and sampling clock frequency are different.

Particularly, the data of the television broadcast services where the horizontal sections for multiplexing data are not fixed can be fetched accurately. Moreover, in this case, it is not required to fetch all data of the horizontal sections where data may be assumed to be multiplexed.

It is also possible to use only one memory in common for both operation modes of the first and second modes. Therefore, it is no longer required to provide a memory for each operation mode and thereby capacity of memory can be reduced.

Particularly, in the case of the teletext, since the current time, broadcasted program ID and broadcast station ID can be fetched, a very effective general purpose decoder can be provided.

What is claimed is:

1. A television multiplex data extracting apparatus for extracting multiplex data in the designated horizontal section among those in the vertical blanking period of the television signal, said extracting apparatus comprising:

mode designating means for designating a data fetch mode;

data extracting means for providing first and second modes as said data fetch mode to isolate and for extracting the multiplex data of said designated horizontal section from said television signal, said data extracting means having means for discriminating the existence or non-existence of the multiplex data; and memory means for storing output data from said data extracting means;

wherein when said first mode is designated by said mode designating means, said data extracting means extracts the multiplex data of said designated horizontal section and transfers said multiplex data to said memory means; and wherein when said second mode is designated by said mode designating means, said discriminating means of said data extracting means discriminates existence or non-existence of the multiplex data in said designated horizontal section and when existence of said multiplex data is discriminated, said data extracting means extracts said multiplex data and transfers said multiplex data to said memory means.

2. A television multiplex data extracting apparatus as set forth in claim 1, wherein when said second mode is designated, said data extracting means discriminates existence of particular multiplex data in said designated horizontal section depending on existence of predetermined data included in said particular multiplex data.

3. A television multiplex data extracting apparatus as set forth in claim 1, wherein when said second mode is designated and the multiplex data in said designated horizontal section or particular multiplex data in said designated horizontal section is discriminated as non-existence, said data extracting means stores predetermined data into said memory means corresponding to said designated horizontal section.

4. A television multiplex data extracting apparatus as set forth in claim 2, wherein said particular multiplex data is the teletext data and said data extracting means discriminates, when existence of said teletext data is detected in said designated horizontal section in said second mode, whether said teletext data is the data of the character broadcast or not depending on the packet number and extracts, when said teletext data is not the data of the character broadcast, the data of said packet number and subsequent packet numbers of said teletext data.

5. A television multiplex data extracting apparatus as set forth in claim 4, wherein said data extracting means further comprises a decode means.

6. A television multiplex data extracting apparatus as set forth in claim 5, wherein said decode means is a Hamming decoder.

7. A television multiplex data extracting apparatus as set forth in claim 6, wherein said Hamming decoder decodes the data of as many as 6 bytes following said designation code when the data following the designation code of said teletext data indicates the current time, and decodes the data of as many as 19 bytes following said designation code when the data following said designation code is the program ID or broadcast station ID.

8. A television multiplex data extracting apparatus as set forth in claim 1, wherein the data stored in said memory means is reset by the vertical synchronous signal of said television signal.

9. A television multiplex data extracting apparatus as set forth in claim 2, wherein said data extracting means discriminates that said particular multiplex data exists when data having difference within the predetermined number of bits from said predetermined data exists within said designated horizontal section.

10. A television multiplex data extracting apparatus as set forth in claim 9, wherein said data extracting means can adjust the slice level based on said difference.

11. A television multiplex data extracting apparatus as set forth in claim 1, wherein an address register for storing address of data stored in said memory means is further provided.

* * * * *